United States Patent
Andersson et al.

(10) Patent No.: US 11,346,969 B2
(45) Date of Patent: May 31, 2022

(54) METHOD FOR SEISMIC ACQUISITION AND PROCESSING

(71) Applicant: APPARITION GEOSERVICES GMBH, Pfäffikon SZ (CH)

(72) Inventors: Fredrik Andersson, Altendorf (CH); Dirk-Jan Van Manen, Otelfingen (CH); Kurt Eggenberger, Schinznach (CH); Johan Robertsson, Wald (CH)

(73) Assignee: APPARITION GEOSERVICES GMBH, Pfäffikon SZ (CH)

( * ) Notice: Subject to any disclaimer, the term of this patent is extended or adjusted under 35 U.S.C. 154(b) by 421 days.

(21) Appl. No.: 16/585,759

(22) Filed: Sep. 27, 2019

(65) Prior Publication Data
US 2020/0025959 A1    Jan. 23, 2020

Related U.S. Application Data

(63) Continuation of application No. PCT/IB2018/051801, filed on Mar. 19, 2018.

(30) Foreign Application Priority Data

Mar. 31, 2017    (GB) ..................................... 1705236

(51) Int. Cl.
  *G01V 1/32*    (2006.01)
  *G01V 1/36*    (2006.01)

(52) U.S. Cl.
  CPC .............. *G01V 1/325* (2013.01); *G01V 1/364* (2013.01); *G01V 2210/1293* (2013.01); *G01V 2210/242* (2013.01); *G01V 2210/44* (2013.01)

(58) Field of Classification Search
  CPC .. G01V 1/325; G01V 1/364; G01V 2210/242; G01V 2210/44; G01V 2210/20; G01V 1/003; G01V 1/28; G01V 2210/127
  See application file for complete search history.

(56) References Cited

U.S. PATENT DOCUMENTS

| | | | | |
|---|---|---|---|---|
| 7,679,990 | B2* | 3/2010 | Herkenhoff | G01V 1/003 367/23 |
| 11,215,723 | B2* | 1/2022 | Salman | G01V 1/302 |
| 2013/0135965 | A1 | 5/2013 | Ji et al. | |
| 2014/0334257 | A1* | 11/2014 | Laws | G01V 1/04 367/15 |

(Continued)

FOREIGN PATENT DOCUMENTS

WO    WO 2017/149418 A1    9/2017

OTHER PUBLICATIONS

International Search Report and Written Opinion dated Apr. 7, 2018 in PCT/IB2018/051801 filed Mar. 19, 2018.

(Continued)

*Primary Examiner* — Mohammad K Islam
(74) *Attorney, Agent, or Firm* — Oblon, McClelland, Maier & Neustadt, L.L.P.

(57) ABSTRACT

A simultaneous sources seismic acquisition method is described that introduces notch diversity to improve separating the unknown contributions of one or more sources from a commonly acquired set of wavefield signals while still allowing for optimal reconstruction properties in certain diamond-shaped regions. In particular, notch diversity is obtained by heteroscale encoding.

18 Claims, 7 Drawing Sheets

(56) References Cited

U.S. PATENT DOCUMENTS

| | | | |
|---|---|---|---|
| 2016/0109594 A1* | 4/2016 | Hegna | G01V 1/32 |
| | | | 367/24 |
| 2017/0115419 A1* | 4/2017 | van Groenestijn | G01V 1/3861 |
| 2017/0235003 A1* | 8/2017 | Elboth | G01V 1/003 |
| | | | 367/17 |
| 2017/0269245 A1* | 9/2017 | Kluever | G01V 1/32 |
| 2017/0371055 A1* | 12/2017 | Poole | G01V 1/366 |
| 2020/0124755 A1* | 4/2020 | Sollner | G01V 1/364 |

OTHER PUBLICATIONS

Van Manen, et al., Aperiodic wavefield signal apparition: De-aliased simultaneous source separation, SEG International Exposition and $86^{th}$ Annual Meeting, Oct. 21, 2016; pp. 102-106.

Robertsson et al., "We LHR 05 Wave field Signal apparition, Part I—Theory", $78^{th}$ EAGE Conference & Exhibition 2016, Vienna, Austria, May 20-Jun. 2, 2016, pp. 1-5.

Andersson, F., et al., "Flawless diamond separation in simultaneous source acquisition by seismic apparition", Geophysical Journal International, vol. 209, Mar. 23, 2017, pp. 1735-1739.

* cited by examiner

METHOD FOR SEISMIC ACQUISITION AND PROCESSING

CROSS-REFERENCE TO RELATED APPLICATIONS

This application is a continuation of PCT Application No. PCT/IB2018/051801, filed Mar. 19, 2018, which claims priority to Great Britain Application No. 1705236.6, filed Mar. 31, 2017. The entire contents of the above-identified applications are incorporated herein by reference

FIELD

The present disclosure relates to methods for acquiring and separating aliased and non-aliased data such as encountered when acquiring and separating contributions from two or more different simultaneously emitting sources in a common set of measured signals representing a wavefield, particularly of seismic sources and of sets of aliased and non-aliased recorded and/or aliased and non-aliased processed seismic signals.

BACKGROUND

Seismic data can be acquired in land, marine, seabed, transition zone and boreholes for instance. Depending on in what environment the seismic survey is taking place the survey equipment and acquisition practices will vary.

In towed marine seismic data acquisition, a vessel tows streamers that contain seismic sensors (hydrophones and sometimes particle motion sensors). A seismic source usually towed by the same vessel excites acoustic energy in the water that reflects from the sub-surface and is recorded by the sensors in the streamers. The seismic source is typically an array of airguns but can also be a marine vibrator for instance. In modern marine seismic operations many streamers are towed behind the vessel, e.g., many parallel closely spaced sail-lines (3D seismic data acquisition). It is also common that several source and/or receiver vessels are involved in the same seismic survey in order to acquire data that is rich in offsets and azimuths between source and receiver locations.

In seabed seismic data acquisition, nodes or cables containing sensors (hydrophones and/or particle motion sensors) are deployed on the seafloor. These sensors can also record the waves on and below the sea bottom and in particular shear waves which are not transmitted into the water. Similar sources as in towed marine seismic data acquisition are used. The sources are towed by one or several source vessels.

In land seismic data acquisition, the sensors on the ground are typically geophones and the sources are vibroseis trucks or dynamite. Vibroseis trucks are usually operated in arrays with two or three vibroseis trucks emitting energy close to each other roughly corresponding to the same shot location.

Figure 7:
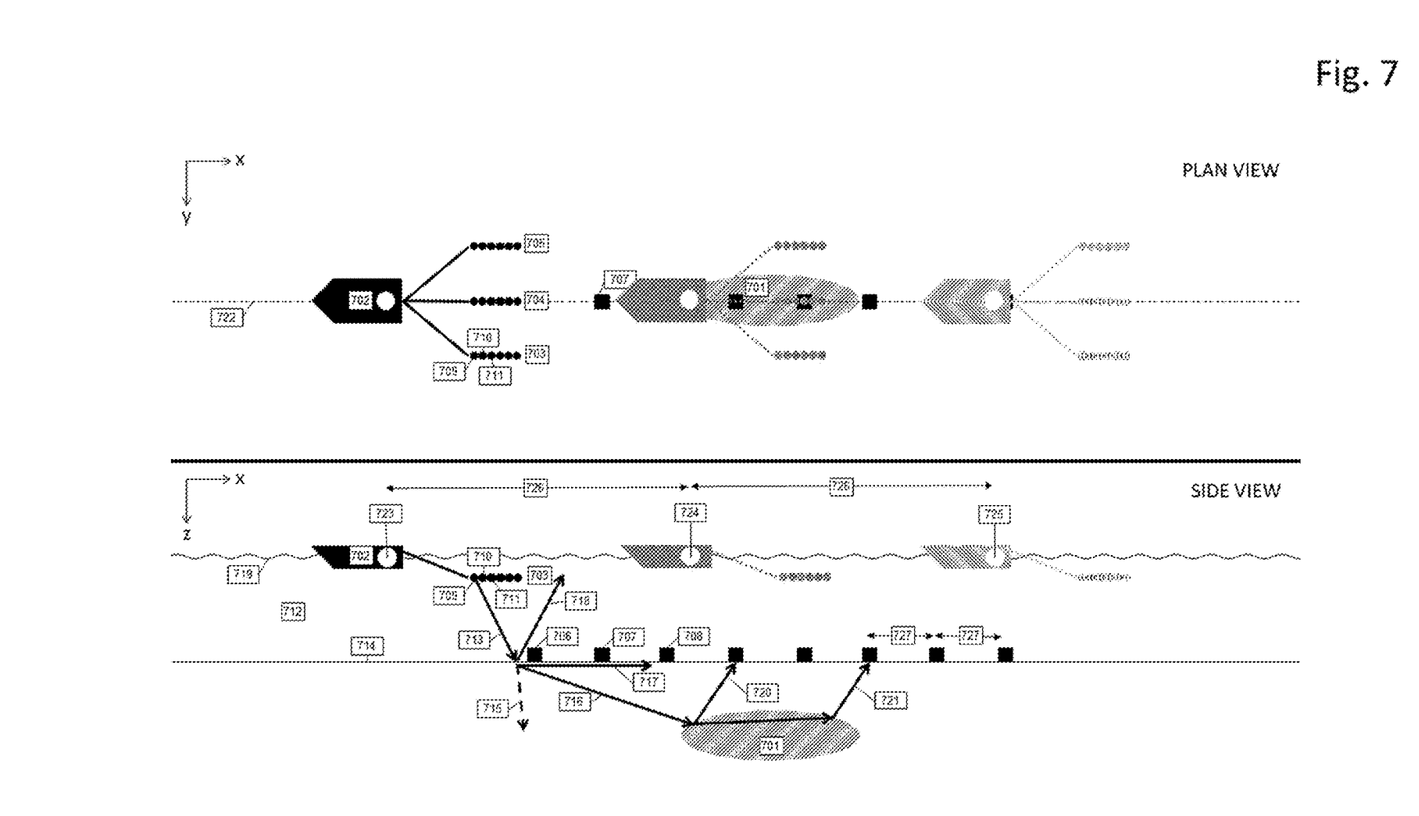
FIG. 7 shows the general practice of marine seismic surveying.

The general practice of marine and seabed seismic surveying is further described below in relation to FIG. 7.

Prospecting for subsurface hydrocarbon deposits (701) in a marine environment (FIG. 7) is routinely carried out using one or more vessels (702) towing seismic sources (703-705). The one or more vessels can also tow receivers or receivers (706-708) can be placed on the seabed (714).

Seismic sources typically employ a number of so-called airguns (709-711) which operate by repeatedly filling up a chamber in the gun with a volume of air using a compressor and releasing the compressed air at suitable chosen times (and depth) into the water column (712).

The sudden release of compressed air momentarily displaces the seawater, imparting its energy on it, setting up an impulsive pressure wave in the water column propagating away from the source at the speed of sound in water (with a typical value of around ~1500 m/s) (713).

Upon incidence at the seafloor (or seabed) (714), the pressure wave is partially transmitted deeper into the subsurface as elastic waves of various types (715-717) and partially reflected upwards (718). The elastic wave energy propagating deeper into the subsurface partitions whenever discontinuities in subsurface material properties occur. The elastic waves in the subsurface are also subject to an elastic attenuation which reduces the amplitude of the waves depending on the number of cycles or wavelengths.

Some of the energy reflected upwards (720-721) is sensed and recorded by suitable receivers placed on the seabed (706-708), or towed behind one or more vessels. The receivers, depending on the type, sense and record a variety of quantities associated with the reflected energy, for example, one or more components of the particle displacement, velocity or acceleration vector (using geophones, mems [microelectromechanical] or other devices, as is well known in the art), or the pressure variations (using hydrophones). The wave field recordings made by the receivers are stored locally in a memory device and/or transmitted over a network for storage and processing by one or more computers.

Waves emitted by the source in the upward direction also reflect downward from the sea surface (719), which acts as a nearly perfect mirror for acoustic waves.

One seismic source typically includes one or more airgun arrays (703-705): that is, multiple airgun elements (709-711) towed in, e.g., a linear configuration spaced apart several meters and at substantially the same depth, whose air is released (near-) simultaneously, typically to increase the amount of energy directed towards (and emitted into) the subsurface.

Seismic acquisition proceeds by the source vessel (702) sailing along many lines or trajectories (722) and releasing air from the airguns from one or more source arrays (also known as firing or shooting) once the vessel or arrays reach particular pre-determined positions along the line or trajectory (723-725), or, at fixed, pre-determined times or time intervals. In FIG. 7, the source vessel (702) is shown in three consecutive positions (723-725), also called shot positions.

Typically, subsurface reflected waves are recorded with the source vessel occupying and shooting hundreds of shots positions. A combination of many sail-lines (722) can form, for example, an areal grid of source positions with associated inline source spacings (726) and crossline source spacings. Receivers can be similarly laid out in one or more lines forming an areal configuration with associated inline receiver spacings (727) and crossline receiver spacings.

Figure 8:
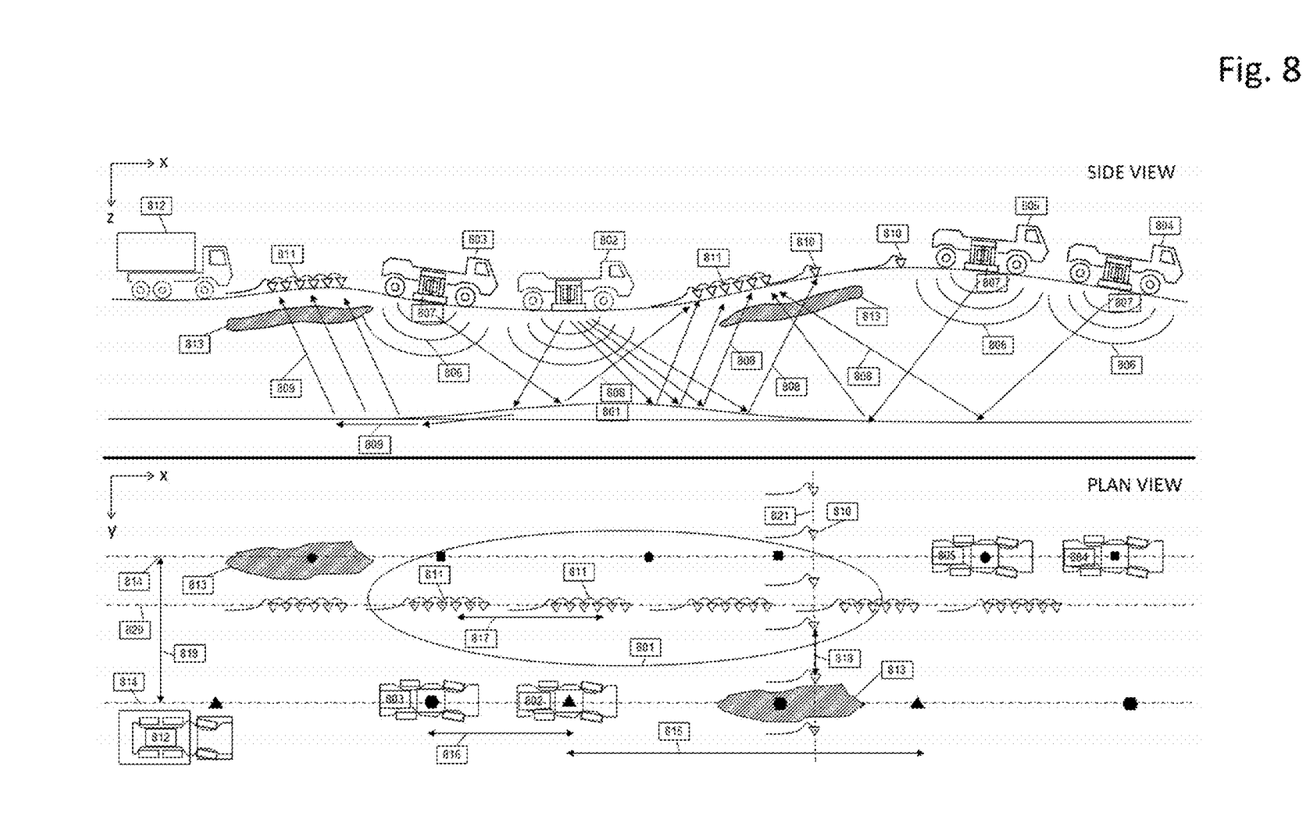
FIG. 8 shows the general practice of land seismic surveying.

The general practice of land seismic surveying is further described below in relation to FIG. 8.

Prospecting for subsurface hydrocarbon deposits (801) in a land environment (FIG. 8) is routinely carried out using one or more groups of so-called seismic vibrators (802-805) or other sources such as shotpipes or dynamite (not shown). Seismic vibrators transform energy provided by, e.g., a diesel engine into a controlled sequence of vibrations that radiate away from the vibrator as elastic waves (806). More specifically, elastic waves emanate from a baseplate (807), connected to a movable element whose relative motion realizes the desired vibrations through a piston-reaction mass system driven by an electrohydraulic servo valve. The baseplate (807) is applied to the ground for each vibration, then raised up so that the seismic vibrator can drive to another vibrating point (indicated by solid markers such as triangles, circles, squares and pentagons in FIG. 8). To transmit maximum force into the ground and to prevent the baseplate from jumping, part of the weight of the vibrator is used to hold down the baseplate.

Thus, one group of seismic sources could consist of the "array" of vibrators 802 and 803, while a second group of sources consists, e.g., of vibrators 804 and 805.

The elastic waves radiating away from the baseplate of the vibrators scatter, reflect (808) and refract (809) at locations or interfaces in the subsurface where the relevant material properties (e.g., mass density, bulk modulus, shear modulus) vary and are recorded at hundreds of thousand of individual/single sensors (810) or at thousands of sensor groups (811). Sensor signals from one or more sensors in a group can be combined or summed in the field before being sent sent to the recording truck (812) over cables or wirelessly.

Source positions may lie along straight lines (814) or various other trajectories or grids. Similarly, receiver positions may lay along lines oriented in a similar direction as the source lines, e.g., 820, and/or oriented perpendicularly to the source lines (821). Receivers may also be laid out along other trajectories or grids. The source spacing along the line (815) is the distance the source in a group move between consecutive shotpoints. The inter source spacing (816) is the distance between two sources in the same source group. Similarly, the receiver spacing is the spacing between individual receivers (e.g., 818) in case single sensors or between sensor groups (e.g., 817). The source line spacing (819) is some representative distance between substantially parallel source lines and similarly for the receiver line spacing. Waves may be affected by perturbations in the near surface (813) which obscure the deeper structure of interest (i.e., possible hydrocarbon bearing formations). In land seismic data acquisition, the sensors on the ground are typically geophones.

Traditionally seismic data have been acquired sequentially: a source is excited over a limited period of time and data are recorded until the energy that comes back has diminished to an acceptable level and all reflections of interest have been captured after which a new shot at a different shot location is excited. Being able to acquire data from several sources at the same time is clearly highly desirable. Not only would it allow to cut expensive acquisition time drastically or to better sample the wavefield on the source side which typically is much sparser sampled than the distribution of receiver positions. It would also allow for better illumination of the target from a wide range of azimuths as well as to better sample the wavefield in areas with surface obstructions. In addition, for some applications such as 3D VSP acquisition, or marine seismic surveying in environmentally sensitive areas, reducing the duration of the survey is critical to save cost external to the seismic acquisition itself (e.g., down-time of a producing well) or minimize the impact on marine life (e.g., avoiding mating or spawning seasons of fish species).

Simultaneously emitting sources, such that their signals overlap in the (seismic) record, is also known in the industry as "blending". Conversely, separating signals from two or more simultaneously emitting sources is also known as "deblending" and the data from such acquisitions as "blended data".

Simultaneous source acquisition has a long history in land seismic acquisition dating back at least to the early 1980's. Commonly used seismic sources in land acquisition are vibroseis sources which offer the possibility to design source signal sweeps such that it is possible to illuminate the sub-surface "sharing" the use of certain frequency bands to avoid simultaneous interference at a given time from different sources. By carefully choosing source sweep functions, activation times and locations of different vibroseis sources, it is to a large degree possible to mitigate interference between sources. Such approaches are often referred to as slip sweep acquisition techniques. In marine seismic data context the term overlapping shooting times is often used for related practices. Moreover, it is also possible to design sweeps that are mutually orthogonal to each other (in time) such that the response from different sources can be isolated after acquisition through simple cross-correlation procedures with sweep signals from individual sources. We refer to all of these methods and related methods as "time encoded simultaneous source acquisition" methods and "time encoded simultaneous source separation" methods.

The use of simultaneous source acquisition in marine seismic applications is more recent as marine seismic sources (i.e., airgun sources) do not appear to yield the same benefits of providing orthogonal properties as land seismic vibroseis sources, at least not at a first glance. Western Geophysical was among the early proponents of simultaneous source marine seismic acquisition suggesting to carry out the separation in a pre-processing step by assuming that the reflections caused by the interfering sources have different characteristics. Beasley et al. (1998) exploited the fact that, provided that the sub-surface structure is approximately layered, a simple simultaneous source separation scheme can be achieved for instance by having one source vessel behind the spread acquiring data simultaneously with the source towed by the streamer vessel in front of the spread. Simultaneous source data recorded in such a fashion is straightforward to separate after a frequency-wavenumber ($\omega\xi$) transform as the source in front of the spread generates data with positive wavenumbers only whereas the source behind the spread generates data with negative wavenumbers only, to first approximation.

Another method for enabling or enhancing separability is to make the delay times between interfering sources incoherent (Lynn et al., 1987). Since the shot time is known for each source, they can be lined up coherently for a specific source in for instance a common receiver gather or a common offset gather. In such a gather all arrivals from all other simultaneously firing sources will appear incoherent. To a first approximation it may be sufficient to just process the data for such a shot gather to final image relying on the processing chain to attenuate the random interference from the simultaneous sources (aka. passive separation). However, it is of course possible to achieve better results for instance through random noise attenuation or more sophisticated methods to separate the coherent signal from the apparently incoherent signal (Stefani et al., 2007; Ikelle 2010; Kumar et al. 2015). In recent years, with elaborate acquisition schemes to for instance acquire wide azimuth data with multiple source and receiver vessels (Moldoveanu et al., 2008), several methods for simultaneous source separation of such data have been described, for example methods that separate "random dithered sources" through inversion exploiting the sparse nature of seismic data in the time-domain (i.e., seismic traces can be thought of as a subset of discrete reflections with "quiet periods" in between; e.g., Akerberg et al., 2008; Kumar et al. 2015). A recent state-of-the-art land example of simultaneous source separation applied to reservoir characterization is presented by Shipilova et al. (2016). Existing simultaneous source acquisition and separation methods based on similar principles include quasi random shooting times, and pseudo random shooting times. We refer to all of these methods and related methods as "random dithered source acquisition" methods and "random dithered source separation" methods. "Random dithered source acquisition" methods and "random dithered source separation" methods are examples of "space encoded simultaneous source acquisition" methods and "space encoded simultaneous source separation" methods.

A different approach to simultaneous source separation has been to modify the source signature emitted by airgun sources. Airgun sources comprise multiple (typically three) sub-arrays along which multiple clusters of smaller airguns are located. Whereas in contrast to land vibroseis sources, it is not possible to design arbitrary source signatures for marine airgun sources, one in principle has the ability to choose firing time (and amplitude i.e., volume) of individual airgun elements within the array. In such a fashion it is possible to choose source signatures that are dispersed as opposed to focused in a single peak. Such approaches have been proposed to reduce the environmental impact in the past (Ziolkowski, 1987) but also for simultaneous source shooting.

Abma et al. (2015) suggested to use a library of "popcorn" source sequences to encode multiple airgun sources such that the responses can be separated after simultaneous source acquisition by correlation with the corresponding source signatures following a practice that is similar to land simultaneous source acquisition. The principle is based on the fact that the cross-correlation between two (infinite) random sequences is zero whereas the autocorrelation is a spike. It is also possible to choose binary encoding sequences with better or optimal orthogonality properties such as Kasami sequences to encode marine airgun arrays (Robertsson et al., 2012). Mueller et al. (2015) propose to use a combination of random dithers from shot to shot with deterministically encoded source sequences at each shot point. Similar to the methods described above for land seismic acquisition we refer to all of these methods and related methods as "time encoded simultaneous source acquisition" methods and "time encoded simultaneous source separation" methods.

Recently there has been an interest in industry to explore the feasibility of marine vibrator sources as they would, for instance, appear to provide more degrees of freedom to optimize mutually orthogonal source functions beyond just binary orthogonal sequences that would allow for a step change in simultaneous source separation of marine seismic data. Laws et al. (2016) suggest to fully shift energy in $\omega k$-space using the well-known Fourier shift theorem in space to separate the response from multiple marine vibrator sources. Such an approach is not possible with most other seismic source technology (e.g., marine airgun sources) which lack the ability to carefully control the phase of the source signature (e.g., flip polarity). Laws et al. (2016) recognize that their method works particularly well at low frequencies where conventional random dithering techniques struggle. They suggest to combine the two methods such that the phase-controlled marine vibrator simultaneous source separation technique is used for the lower frequencies and simultaneous source separation based on random dithers is used at the higher frequencies.

Figure 1:
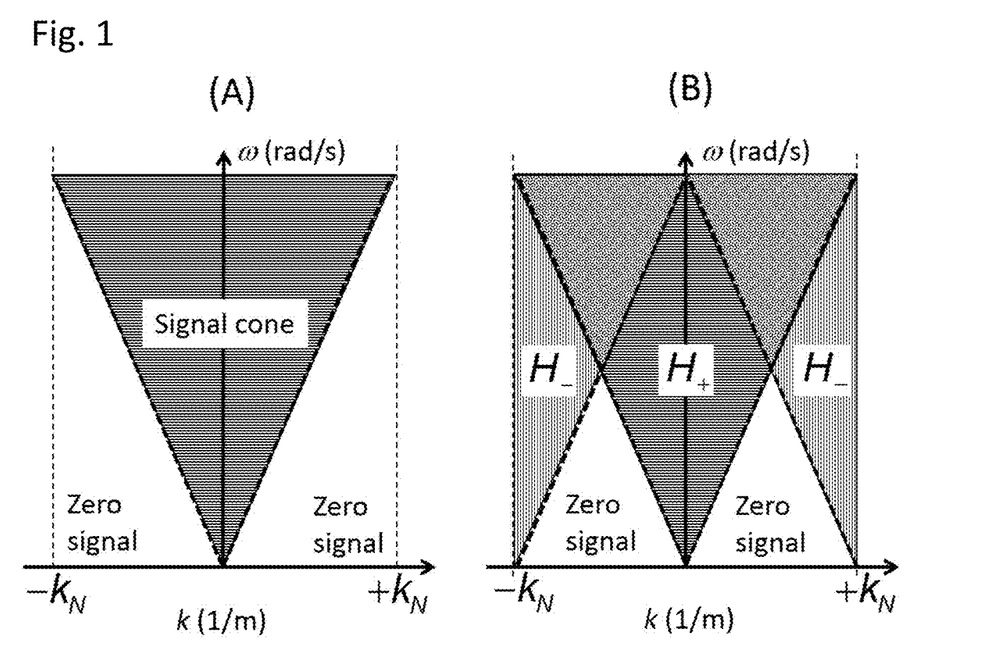
FIG. 1 illustrates how in a conventional marine seismic survey all signal energy of two sources typically sits inside a "signal cone" (horizontally striped) bounded by the propagation velocity of the recording medium and how this energy can be split in a transform domain by applying a modulation to the second source.

A recent development, referred to as "signal apparition" (also referred to as wavefield apparition in this invention), suggests an alternative approach to deterministic simultaneous source acquisition that belongs in the family of "space encoded simultaneous source acquisition" methods and "space encoded simultaneous source separation" methods. Robertsson et al. (2016) show that by using periodic modulation functions from shot to shot (e.g., a short time delay or an amplitude variation from shot to shot), the recorded data on a common receiver gather or a common offset gather will be deterministically mapped onto known parts of for instance the $\omega\xi$-space outside the conventional "signal cone" where conventional data is strictly located. The signal cone contains all propagating seismic energy with apparent velocities between water velocity (straight lines with apparent slowness of $+-1/1500$ s/m in $\omega\xi$-space) for the towed marine seismic case and infinite velocity (i.e., vertically arriving events plotting on a vertical line with wavenumber 0). The shot modulation generates multiple new signal cones that are offset along the wavenumber axis thereby populating the $\omega\xi$-space much better and enabling exact simultaneous source separation below a certain frequency (FIG. 1b). Robertsson et al. (2016) referred to the process as "wavefield apparition" or "signal apparition" in the meaning of "the act of becoming visible". In the spectral domain, the wavefield caused by the periodic source sequence is nearly "ghostly apparent" and isolated. A critical observation and insight in the "signal apparition" approach is that partially injecting energy along the $\omega\xi$-axis is sufficient as long as the source variations are known as the injected energy fully predicts the energy that was left behind in the "conventional" signal cone. Following this methodology simultaneously emitting sources can be exactly separated using a modulation scheme where for instance amplitudes and or firing times are varied deterministically from shot to shot in a periodic pattern.

In the prior art it has been suggested to combine different methods for simultaneous source acquisition. Müller et al. (2015) outline a method based on seismic data acquisition using airgun sources. By letting individual airguns within a source airgun array be actuated at different times a source signature can be designed that is orthogonal to another source signature generated in a similar fashion. By orthogonal, Müller et al. (2015) refer to the fact that the source signatures have well-behaved spike-like autocorrelation properties as well as low cross-correlation properties with regard to the other source signatures used. On top of the encoding in time using orthogonal source signatures, Müller et al. (2015) also employ conventional random dithering (Lynn et al., 1987). In this way, two different simultaneous source separation approaches are combined to result in an even better simultaneous source separation result. The method of signal apparition (Robertsson et al., 2016) allows for exact simultaneous source separation given sufficient sampling along the direction of spatial encoding (there is always a lowest frequency below which source separation is exact). It is the only exact method there exists for conventional marine and land seismic sources such as airgun sources and dynamite sources.

Given the case of insufficient sampling, e.g., along the direction of spatial encoding, van Manen et al. (2016b) and Andersson et al. (2017a) provide methods for simultaneous source separation (decoding) that include wavefield de-aliasing/reconstruction steps.

The method of signal apparition requires good control of firing times, locations and other parameters. Seismic data are often shot on position such that sources are triggered exactly when they reach a certain position. If a single vessel tows multiple sources acquisition fit for signal apparition is simply achieved by letting one of the sources be a master source which is shot on position. The other source(s) towed by the same vessel then must fire synchronized in time according to the firing time of the first source. However, as all sources are towed by the same vessel the sources will automatically be located at the desired positions—at least if crab angles are not too extreme. In a recent patent application (van Manen et al., 2016a) we submitted methods that demonstrate how perturbations introduced by, e.g., a varying crab angle can be dealt with in an apparition-based simultaneous source workflow. The same approach can also be used for simultaneous source separation when sources are towed by different vessels or in land seismic acquisition. Robertsson et al. (2016b) suggest approaches to combine signal apparition simultaneous source with other simultaneous source separation methods.

However, it has been found that the use of the above signal apparition methods may introduce notches in the spectrum of the acquired wavefield which in turn could limit the separation of contributions due to the individual sources.

SUMMARY

In view of the above methods for acquiring and processing of heteroscale-encoded wavefield data are presented herein that exploit the controlled variations of modulation functions to achieve a notch diversity with the encoding process that helps to improve the separation of dealiased and reconstructed recorded source wavefield information, suited particularly for seismic applications and other purposes, substantially as shown in and/or described in connection with at least one of the figures, and as set forth more completely in the claims.

In particular it is herein proposed to make use of heteroscale encoding that is obtained by a controlled variation of modulation functions where the relative variation of these against each other can be exploited to improve the separation of simultaneous source data. Moreover, the technique can also be used in conjunction with methods to reduce the effects of aliasing due to limitations in sampling. Such novel methods to reduce aliasing have been submitted in Andersson et al. (2017a) and van Manen et al. (2016b).

Advantages, aspects and novel features of the present inventions, as well as details of an illustrated embodiment thereof, may be more fully understood from the following description and drawings.

BRIEF DESCRIPTION OF THE DRAWINGS

In the following description reference is made to the attached figures, in which.

DETAILED DESCRIPTION

The following examples may be better understood using a theoretical overview as presented below.

The slowest observable (apparent) velocity of a signal along a line of recordings in any kind of wave experimentation is identical to the slowest physical propagation velocity in the medium where the recordings are made. As a result, after a spatial and temporal Fourier transform, large parts of the frequency-wavenumber ($\omega k$) spectrum inside the Nyquist frequency and wavenumber tend to be empty. In particular, for marine reflection seismic data (Robertsson et al., 2015), the slowest observable velocity of arrivals corresponds to the propagation velocity in water (around 1500 m/s).

FIG. 1, (A) part (A) illustrates how all signal energy when represented in or transformed into the frequency-wavenumber ($\omega k$) domain sits inside a "signal cone" centered at k=0 and bounded by the propagation velocity of the recording medium.

It is well known, for example, that due to the "uncertainty principle", a function and its Fourier transform cannot both have bounded support. As (seismic) data are necessarily acquired over a finite spatial (and temporal) extent, the terms "bounded support" and "limited support" herein are used not in the strict mathematical sense, but rather to describe an "effective numerical support", that can be characterised, e.g., by the (amplitude) spectrum being larger than a certain value. For instance, larger than a certain noise threshold, or larger than the quantization error of the analog-to-digital converters used in the measurement equipment. Further, it is understood that by explicitly windowing space and/or space-time domain data, the support of a function may be spread over a larger region of, e.g., the wavenumber-frequency domain and in such cases the term "bounded support" and "limited support" will also be understood as "effective numerical support" as it will still be possible to apply the methods described herein.

Furthermore, the terms "cone" and "cone-shaped" used herein are used to indicate the shape of the "bounded" or "effective numerical" support of the data of interest (e.g., the data that would be recorded firing the sources individually [i.e. non-simultaneously]) in the frequency-wavenumber domain. In many cases, it will still be possible to apply the methods described herein if the actual support is approximately conic or approximately cone-shaped. For example, at certain frequencies or across certain frequency ranges the support could be locally wider or less wide than strictly defined by a cone. Such variations are contemplated and within the scope of the appended claims. That is, the terms "cone" and "cone-shaped" should be understood to include approximately conic and approximately cone-shaped. In addition, in some cases we use the terms "bounded support" or "limited support" and "effective numerical support" to refer to data with "conic support" or "cone-shaped support" even though in the strict mathematical sense a "cone" is not bounded (as it extends to infinite temporal frequency). In such cases, the "boundedness" should be understood to refer to the support of the data along the wavenumber axis/axes, whereas "conic" refers to the overall shape of the support in the frequency-wavenumber domain.

Note that the term "cone-shaped support" or similar refers to the shape of the support of e.g. the data of interest (in the frequency-wavenumber domain), if it were regularly sampled along a linear trajectory in 2D or Cartesian grid in 3D. That is, it refers only to the existence of such a support and not to the actual observed support of the data of interest in the simultaneous source input data or of the separated data of interest sampled as desired. The support of both of these depends on the chosen regularly or irregularly sampled straight or curved input (activation) and output (separation) lines or grids. Such variations are within the scope of the appended claims.

For example consider a case where the input data are acquired using simultaneous curved shot lines. In this case, the methods described herein can either be applied directly to the input data, provided the curvature has not widened the support of the data interest such that it significantly overlaps with itself. In this case, the support used in the methods described herein can be different from cone-shaped. Alternatively, the methods described herein are used to reconstruct the data of interest in a transform domain which corresponds to, e.g., best-fitting regularly sampled and/or straight activation lines or Cartesian grids, followed by computing the separated data of interest in the non-transformed domain at desired regular or irregularly sampled locations.

In a wavefield experiment it may be that a source is excited sequentially for multiple source locations along a line while recording the reflected wavefield on at least one receiver. The source may be characterized by its temporal signature. In the conventional way of acquiring signals representing a wavefield the source may be excited using the same signature from source location to source location, denoted by integer n. Next, consider the alternative way of acquiring such a line of data using a periodic sequence of source signatures: every second source may have a constant signature and every other second source may have a signature which can for example be a scaled or filtered function of the first source signature. Let this scaling or convolution filter be denoted by a(t), with frequency-domain transform $A(\omega)$. Analyzed in the frequency domain, using for example a receiver gather (one receiver station measuring the response from a sequence of sources) recorded in this way, can be constructed from the following modulating function m(n) applied to a conventionally sampled and recorded set of wavefield signals:

$$m(n) = \tfrac{1}{2}[1+(-1)^n] + \tfrac{1}{2}A[1-(-1)^n],$$

which can also be written as $$m(n) = \tfrac{1}{2}[1+e^{i\pi n}] + \tfrac{1}{2}A[1-e^{i\pi n}]. \quad (0.1)$$

By applying the function m in Eq. 0.1 as a modulating function to data $f(n)$ before taking a discrete Fourier transform in space (over n), $F(k) = \mathcal{F}(f(n))$, the following result can be obtained:

$$\mathcal{F}(f(n)m(n)) = \quad (0.2)$$
$$\frac{1+A}{2}F(k) + \frac{1-A}{2}F(k-k_N) = A_+F(k) + A_-F(k-k_N),$$

which follows from a standard Fourier transform result (wavenumber shift) (Bracewell, 1999).

Eq. 0.2 shows that the recorded data $f$ will be replicated in two places in the spectral domain as illustrated in FIG. 1(B) by means of related versions of $f$ where the relationship between the original $f$ and the two related versions is due to the multiplicative operators $A_+$ and $A_-$ quantified in Tab. I for different choices of $A(\omega)$.

TABLE I

Mapping of signal to cone centered at k = 0 ($A_+$) and cone centered at k = $k_N$ ($A_-$) for different choices of $A(\omega)$ for signal separation or signal apparition in Eq. (0.2).

| $A(\omega)$ | $A_- = (1 - A)/2$ | $A_+ = (1 + A)/2$ |
|---|---|---|
| 1 | 0 | 1 |
| -1 | 1 | 0 |
| 0 | ½ | ½ |
| ½ | ¼ | ¾ |
| $e^{i\omega T}$ | $(1 - e^{i\omega T})/2$ | $(1 + e^{i\omega T})/2$ |
| $1 + e^{i\omega T}$ | $-e^{i\omega T}/2$ | $1 + e^{i\omega T}/2$ |

Part of the data will remain at the signal cone centered around k=0 (denoted by $A_+$ in FIG. 1, part (B) (b)) and part of the data will be scaled and replicated to a signal cone centered around $k_N$ (denoted by $A_-$). It can be observed that by only knowing one of these parts of the data it is possible to predict the other.

This process may be referred to as "wavefield apparition" or "signal apparition" in the meaning of "the act of becoming visible". In the spectral domain, the wavefield caused by the periodic source sequence is nearly "ghostly apparent" and isolated.

A particular application of interest that can be solved by using the result in Eq. (0.2) is that of simultaneous source separation. Assume that a first source with constant signature is moved along an essentially straight line with uniform sampling of the source locations where it generates the wavefield g. Along another essentially straight line a second source is also moved with uniform sampling. Its signature is varied for every second source location according to the deterministic modulating sequence m(n), generating the wavefield h. The summed, interfering data $f = g+h$ are recorded at a receiver location.

In the frequency-wavenumber domain, where the recorded data are denoted by F=G+H, the H-part is partitioned into two components $H_+$ and $H_-$ with $H=H_++H_-$ where the $H_-$-component is nearly "ghostly apparent" and partially isolated around the Nyquist-wavenumber [FIG. 1(B)], whereas G and $H_+$ are overlapping wavefields around k=0. Furthermore, $H_-$ completely determined by H and the multiplicative operator _. This means that H can be reconstructed from $H_-$ for all values of $H_-$ such that $A_-(\omega)$ is non-zero and such that $H_-(\omega,k)$ and $H_-(\omega,k-k_N)$ do not overlap. For the partial reconstruction of, the corresponding partial reconstruction of G can be obtained through the relationship G=F−H yielding the separated partially recovered wavefields g and h in the time-space domain.

Although the above description has focused on acquisition along essentially straight lines, the methodology applies equally well to curved trajectories such as coil-shaped trajectories, circles, or other smoothly varying trajectories or sequences of source activations.

The concept may be extended to the simultaneous acquisition of more than two source lines by choosing different modulation functions for each source and it can be applied to higher dimensional source sampling in space (van Manen et al., 2016c).

Acquiring a source line where the first two source locations have the same signature, followed by two again with the same signature but modified from the previous two by the function $A(\omega)$ and then repeating the pattern again until the full source line has been acquired, will generate additional signal cones centered around $\pm k_N/2$.

In the following, such additional scaled or related signal cones, which may occur at various "shifted" locations along the wavenumber axis, or axes (in case of higher dimensional spatial encoding), are also referred to individually as a "shifted replica of a related version of the wavefield of one of the sources". The support of these shifted replica, may or may not be theoretically bounded and may or may not be strictly shaped as a cone as explained in more detail elsewhere herein. For completeness, the introduction of such shifted replicates of related versions at various locations along the wavenumber axis/axes is also referred to herein using the terms "injecting" and "partially injecting". Furthermore, as should be clear from the text and Tab. I, the words "scaled" and "related" are used herein to describe the action of a multiplicative operator which can have, for example, a temporal frequency dependence.

FIG. 1, (B)Part(B) also illustrates a possible limitation of signal apparition. The $H_+$ and $H_-$ parts are separated within the respective diamond-shaped regions in FIG. 1, (B)part (B). In the triangle-shaped parts they interfere and may no longer be separately predicted without further assumptions and van Manen et al. (2016c) describe methods how to address this. In the example shown in FIG. 1, part(B), it can therefore be noted that the maximum non-aliased frequency for a certain spatial sampling is reduced by a factor of two after applying signal apparition. Assuming that data are adequately sampled, the method nevertheless enables full separation of data recorded in wavefield experimentation where two source lines are acquired simultaneously.

As is evident from Tab. I, the special case $A=1$ corresponds to regular acquisition and thus produces no signal apparition. Obviously, it is advantageous to choose A significantly different from unity so that signal apparition becomes significant and above noise levels. The case where $A=-1$ (acquisition of data where the source signature flips polarity between source locations) may appear to be the optimal choice as it fully shifts all energy from $k=0$ to $k_N$ (Bracewell, 1999). Although this is a valid choice for modeling, it is not practical for many applications (e.g., for marine air gun sources, see Robertsson et al., 2015 as it requires the ability to flip polarity of the source signal. The case where $A=0$ (source excited every second time only) may be a straightforward way to acquire simultaneous source data but has the limitation of reduced sub-surface illumination. A particularly attractive choice of $A(\omega)$ for wave experimentation seems to let every second source be excited a time shift T later compared to neighbouring recordings, that is, select $A=e^{i\omega T}$.

The above description assumes a simple modulating sequence m(n), and thus generating the wavefield h. In practice it is difficult to obtain perfectly periodic time shifts from a measurement setup. It is for example common practice for seismic vessels to shoot or trigger their sources at predetermined (essentially equidistant) positions, and due to practical variations (vessel velocity etc.) it will be difficult to realize shots at both predetermined locations and times.

Deviations, or also called perturbations, from a nominal encoding setup in the simultaneous source acquisition, for example such as described above, can be dealt with using a variety of methods, for example such as the methods discussed in van Manen et al. [2016a].

Following such deterministic and periodic shot modulation, recorded data are partially injected into a small number of "new" signal cones offset along the wavenumber axis thereby populating the frequency-wavenumber space much better compared to conventional single-source acquisition and enabling exact simultaneous source separation below a certain frequency.

A critical observation and insight in the signal apparition approach is that partially injecting energy along the wavenumber axis is sufficient as long as the source variations are known as the injected energy fully predicts the energy that was left behind in the "conventional" signal cone.

[Andersson et al., 2017b] demonstrate, by mathematical proof, that the signal apparition simultaneous source approach overcomes a fundamental limitation in non-periodic (e.g., random dithered) simultaneous source acquisition and is able to exactly recover a region in frequency-wavenumber space that is twice as large compared to the case of random, dithered simultaneous source acquisition. We refer herein to such a region as a "flawless diamond" or to this process and its result as "flawless reconstruction" on a "diamond-shaped" area.

A known drawback, for the exemplified periodic time shift modulation functions, is that the periodicity introduces notches in the frequency spectrum which prevent direct exact recovery as outlined above, and this poses challenges to source separation and reconstruction. Thus it is an objective of the current invention to provide methods that do not suffer this drawback. To this end, a methodology for heteroscale encoding and decoding (e.g., acquisition, respectively, processing) is introduced which introduces notch diversity while allowing for flawless reconstruction in diamond-shaped regions that are only slightly smaller compared to those enabled by encoding using periodic time shifts.

Let us start by recapitulating some one-dimensional properties of the Fourier transform. We will use the notation $$\hat{f} = \int_{-\infty}^{\infty} f(x) e^{-2\pi i x \xi} dx$$

for the Fourier transform in one variable, and consequently $\hat{f}(\omega,\xi)$ for the Fourier transform of two dimensional function $f(t,x)$ with a time (t) and spatial (x) dependence, and $\hat{f}^t(\omega,x)$ to denote the Fourier transform of $f$ solely with respect to the time variable, and correspondingly we will use $\hat{f}^x(\omega,x)$ for the Fourier transform solely with respect to the spatial variable.

We will make use of the following version of the Poisson sum formula $$\sum_{k=-\infty}^{\infty} f(k\Delta_x + x_0) e^{-2\pi i (k\Delta_x + x_0)\xi} = \frac{1}{\Delta_x} \sum_{k=-\infty}^{\infty} \hat{f}\left(\xi + \frac{k}{\Delta_x}\right) e^{-2\pi i x_0 \frac{k}{\Delta_x}}$$

given some spatial sampling parameter $\Delta_x$ and fixed spatial shift $x_0$, [Andersson et al., 2016].

Suppose that $f_1(t,x), \ldots, f_M(t,x)$ are M represent seismic data from M different sources and consider the case where sources are sampled simultaneously using the pattern $$d(t, \Delta_x k) = \sum_{n=1}^{M} a_{k,n} f_n(t - \tau_{k,n}, \Delta_x k), \quad (1)$$

where the time shifts $\tau_{k,n}$ are of the form $$\tau_{k,n} = h(k)\tau_{k,n}^p$$

where $\tau_{k,n}^P$ as well as the amplitude factors $a_{k,n}$ vary periodically with period M, i.e., $\tau_{k+M,n}^P = \tau_{k,n}^P$, and $a_{k+M,n} = a_{k,n}$.

Let us define $$D(\omega, \xi) = \sum_{k=-\infty}^{\infty} \int_{-\infty}^{\infty} d(t, \Delta_x k) e^{-2\pi i(t\omega + \Delta_x k\xi)} dt.$$

We may rewrite this as $$D(\omega, \xi) = \sum_{m=1}^{M} \sum_{k=-\infty}^{\infty} \int_{-\infty}^{\infty} d(t, \Delta_x(Mk+m)) e^{-2\pi i(t\omega + \Delta_x(Mk+m)\xi)} = \quad (2)$$

$$\sum_{m=1}^{M} \sum_{n=1}^{M} a_{m,n} \sum_{k=-\infty}^{\infty} \int_{-\infty}^{\infty} (f_n(t - \tau_{m,n}^P h(kM+m), \Delta_x(kM+m))$$

$$e^{-2\pi i(t\omega + \Delta_x(Mk+m)\xi)} dt$$

Let us look more carefully at the inner sum above. To begin with, we may evaluate the Fourier integral to obtain terms of the form $$\hat{f}_n^t(\omega, \Delta_x(kM+m)) e^{-2\pi i \tau_{m,n}^P h(kM+m)} e^{-2\pi i(t\omega + \Delta_x(Mk+m)\xi)}$$

By introducing $$\hat{g}_{m+n}^t(\omega, kM+m) = \hat{f}_n^t(\omega, \Delta_x(kM+m)) e^{-2\pi i \tau_{m,n}^P(kM+m)}$$

we can express the inner sum of using the Poisson sum formula as $$\sum_{k=-\infty}^{\infty} \hat{g}_{m+n}^t(\omega, kM+m) e^{-2\pi i(t\omega + \Delta_x(Mk+m)\xi)} =$$

$$\sum_{k=-\infty}^{\infty} \hat{g}_{m+n}\left(\omega, \xi + \frac{k}{M\Delta_x}\right) e^{-2\pi i \frac{mk}{M}} =$$

$$\sum_{k=-\infty}^{\infty} (\hat{f}_n \overset{x}{*} e^{-2\pi i \tau_{m,n} h(\cdot)}) \left(\omega, \xi + \frac{k}{M\Delta_x}\right) e^{-2\pi i \frac{mk}{M}}$$

We may thus conclude that $$D(\omega, \xi) = \sum_{k=-\infty}^{\infty} \times \sum_{n=1}^{M} \sum_{m=1}^{M} (\hat{f}_n \overset{x}{*} e^{-2\pi i \tau_{m,n} h(\cdot)}) \left(\omega, \xi + \frac{k}{M\Delta_x}\right) e^{-2\pi i \frac{mk}{M}} \quad (3)$$

Let us for the moment assume that $h(x)=1$. Since the functions $f_{r1} f_M$ describe seismic measurements, their Fourier transforms have support a conic domain of the form $\mathcal{C} = \{(\omega, \xi) : \omega^2 \geq c^2 \xi^2\}$, where c denotes the velocity of sound in the media, e.g., water.

For values of $(\omega, \xi)$ in the diamond shaped region $$\mathcal{D} = \mathcal{C} \setminus \left(\left(\mathcal{C} - \left(0, \frac{1}{M\Delta_x}\right)\right) \cup \left(\mathcal{C} + \left(0, \frac{1}{M\Delta_x}\right)\right)\right),$$

it thus holds that the supports of $$\hat{f}_n\left(\cdot, \cdot + \frac{k}{M\Delta_x}\right)$$

are non-intersecting for different values of k (and n fixed).

This, in combination with the fact that $D(\omega,\xi)$ is periodic in $\xi$ with a period of $1/(M\Delta_x)$, implies that if we define $$D_m(\omega, \xi) = D\left(\omega, \xi + \frac{m}{M\Delta_x}\right),$$

for each $(\omega,\xi) \in \mathcal{D}$, there is a linear relationship between $D_m(\omega,\xi)$ and $\hat{f}_n(\omega,\xi)$.

Let us now turn our attention back to the function h. For general choices of h, the argument about non-overlapping parts of the diamond shaped regions break down. However, if h is chosen to be of slow variation (i.e. that $\hat{h}$ has small numeric support), then the convolutions $$\hat{g}_n \overset{x}{*} e^{-2\pi i \tau_{m,n} h(\cdot)}$$

will effectively have support in domains that are only slightly larger than $\mathcal{C}$.

It then approximately holds that $$D_m(\omega, \xi) \approx D_m^a(\omega, \xi) = \sum_{n=1}^{M} \sum_{k=1}^{M} (\hat{f}_n \overset{x}{*} e^{-2\pi i \tau_{k,n} h(\cdot)})(\omega, \xi) e^{2\pi i \frac{mk}{M}}.$$

If we now apply a Fourier transformation with respect to the spatial variable we obtain the relationship $$D_m^a(\omega, x) = \sum_{n=1}^{M} \sum_{k=1}^{M} \hat{f}_n^t(\omega, x) e^{-2\pi i \tau_{k,n} h(x)} e^{2\pi i \frac{mk}{M}}.$$

Upon inspection, we can see that the above expression can be simplified if expressed in terms of matrices. Hence, let define the column vectors $D_{\omega,x} = (D_1^a(\omega,x), \ldots, D_M^a(\omega,x))^T$, and $F_{\omega,x} = (\hat{f}_1^t(\omega,x), \ldots, \hat{f}_M^t(\omega,x))^T$, it holds that $D_{\omega,x} = BA_{\omega,x} F_{\omega,x}$, where $A_{\omega,x}$ and B are M×M matrices defined by $$A_{\omega,x}(m, n) = a_{m,n}e^{-2\pi i \omega \tau_{m,n}^P h(x)}, \text{ and}$$

$$B(m, n) = e^{2\pi i \frac{mn}{M}}.$$

The above system is invertible as long as $A_{\omega,x}$ is invertible, since the matrix B is a discrete Fourier matrix.

Let us now (without practical limitation) assume that the time shift $\tau_{m,n}^P$ are rational numbers. They can then clearly be represented as $\tau_{m,n}^P = T_{m,n}\Delta_T$ for integer values of $T_{m,n}$ and some $\Delta_T$. Let $\omega_x = \omega h(x)\Delta_T$. Note that the elements in $A_{\omega,x}$ are now periodic with respect to $\omega$ with a period defined by $h(x)\Delta_T$. A condition about invertibility can then be posed using polynomial as follows: Let $P_T(z)$ be the polynomial matrix with monomial elements $$(P_T)_{m,n}(z) = a_{m,n}z^{T_{m,n}},$$

and define $$p_T(z) = \det(P_T(z)). \quad (4)$$

It clearly holds that $$\det(A_{\omega,x}) = p_T(e^{2\pi i \omega h(x)\Delta_T}).$$

The individual sources can now be reconstructed from the relation $$F_{\omega,x} = \frac{1}{p_T(e^{2\pi i \omega h(x)\Delta_T})} adj \ (P_T(e^{2\pi i \omega h(x)\Delta_T}))B^{-1}D_{\omega,x},$$

where adj denotes the matrix adjugate.

The problem is solvable as long as $p_T$ is non-zero. A special case of practical interest is when there is no amplitude variation, i.e., when $a_{m,n}=1$. In this case $p_T$ does always have at least one root on the unit circle, namely at x=1. This happens for $\omega=0$, and the polynomial matrix $P_T(1)$ then becomes a matrix with only ones, which clearly have zero determinant. Note that this also implies that there is a notch at $\omega=1/(h(x)\Delta_t)$.

In case it is not possible for practical reasons to choose $\Delta_x$ small enough to avoid non-zero notches, the above procedure shows that it is possible to introduce notch diversity by introducing a factor h that varies slowly. The sampling thus contains two types of time shifts, one that is varying rapidly and one that is varying slowly. The presence of variation in sampling delays at different scales motivates the term heteroscale encoding.

A person skilled in the art will realize that it would be possible to obtain such heteroscale encoding sequences by a variety of means, e.g., by superposition of modulation functions, by varying acquisition parameters other than the source activation time (e.g., varying the relative depth of the simultaneous sources etc.). In this context, it should be mentioned that a related beneficial concept of notch diversity has been introduced previously [Soubaras and Lafet, 2013], where the depth of individual sources or receivers is varied intentionally to in order to directly control and vary the frequency of the notch introduced by sea-surface reflection. Note that in this case the notch is directly the result of the destructive interference of the upgoing and downgoing, sea-surface reflected waves and not due to variations in source activation times (or variations in the relative tow depths of the simultaneous sources, as suggested herein).

A schematic outline of the reconstruction procedure is given below:
 a. Conduct a two dimension Fourier transform of the M-source simultaneous data to compute D with $N_t$ samples in time and $N_s$ samples in the, e.g., inline source coordinate.
 b. Reshape the two dimensional data D into a data cube of size $N_t \times N_s/M \times M$.
 c. Apply FFT in the third dimension, i.e., apply $B^{-1}$.
 d. Apply FFT in the second dimensions, i.e., compute a spatial inverse Fourier transform
 e. Apply the adjugate of the polynomial matrix $P_T$.
 f. Apply a regularized version of $1/p_T$, e.g.

$$\frac{\overline{p_T}}{\max(|p_T|^2, \mu)}$$

for some choice of regularization parameter $\mu$.

Figure 2:
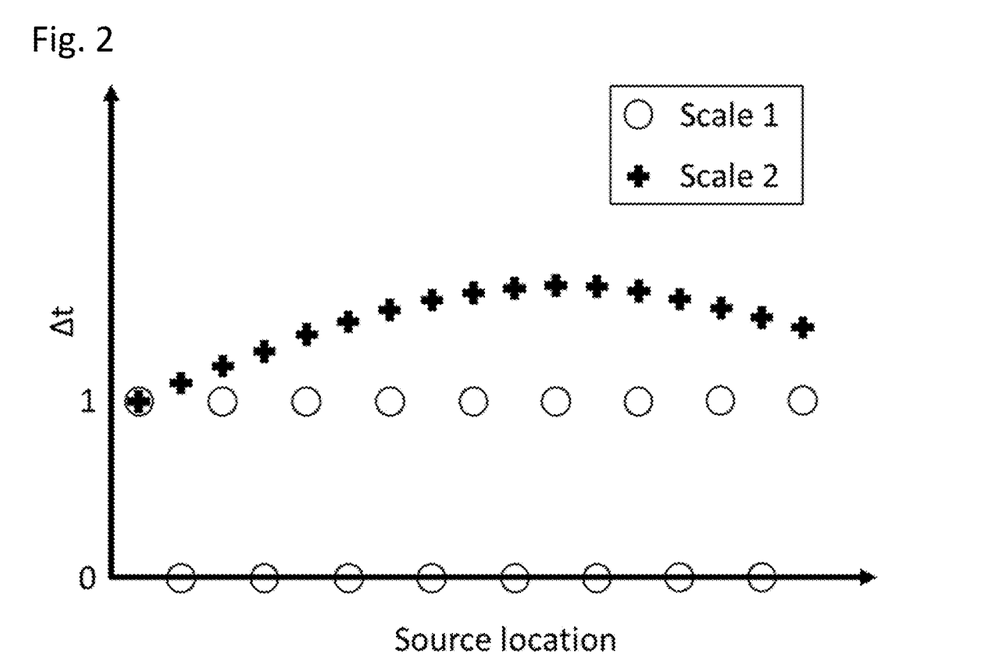
FIG. 2 illustrates one embodiment of time shifts at various scales as a function of shot position.
Figure 3:
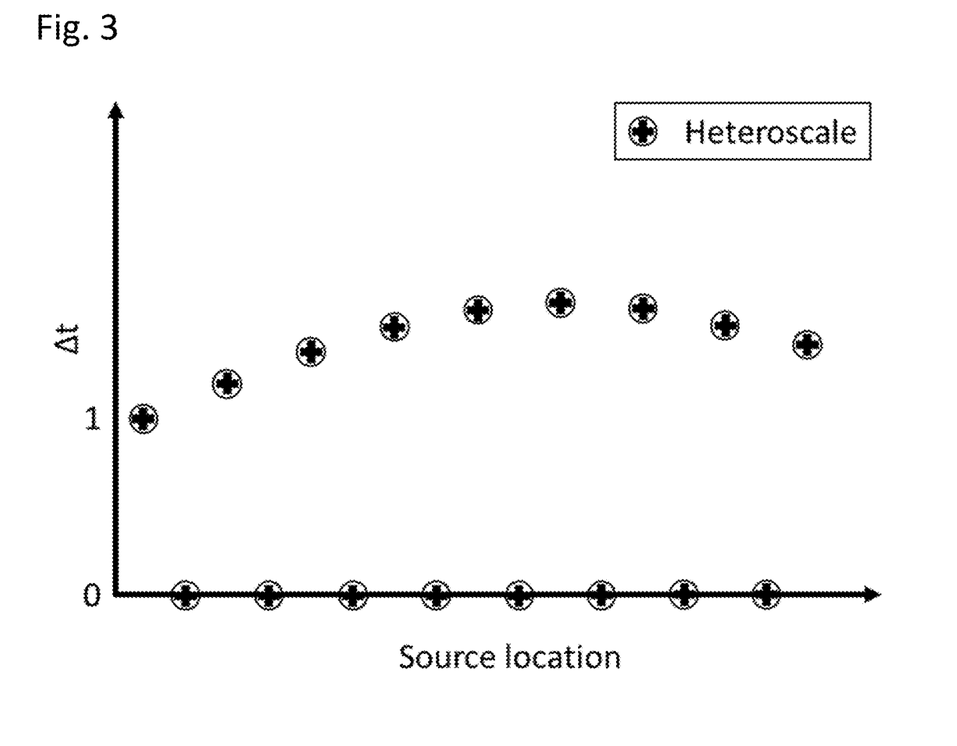
FIG. 3 illustrates heteroscale encoding sequence derived from the example in FIG. 2.
Figure 4:
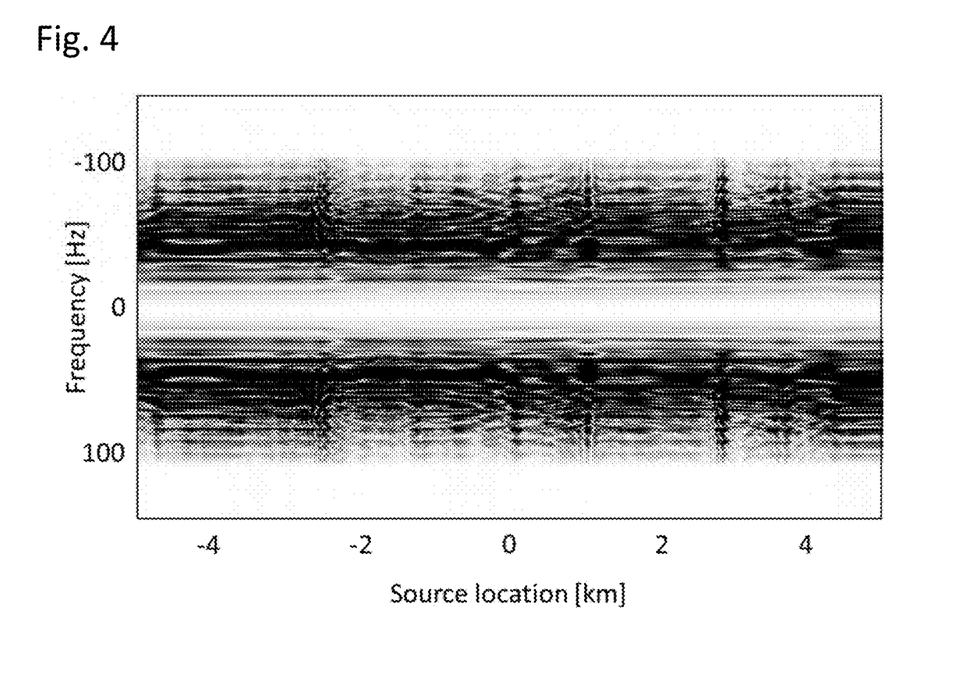
FIG. 4 shows original data in the f-x domain.
Figure 5:
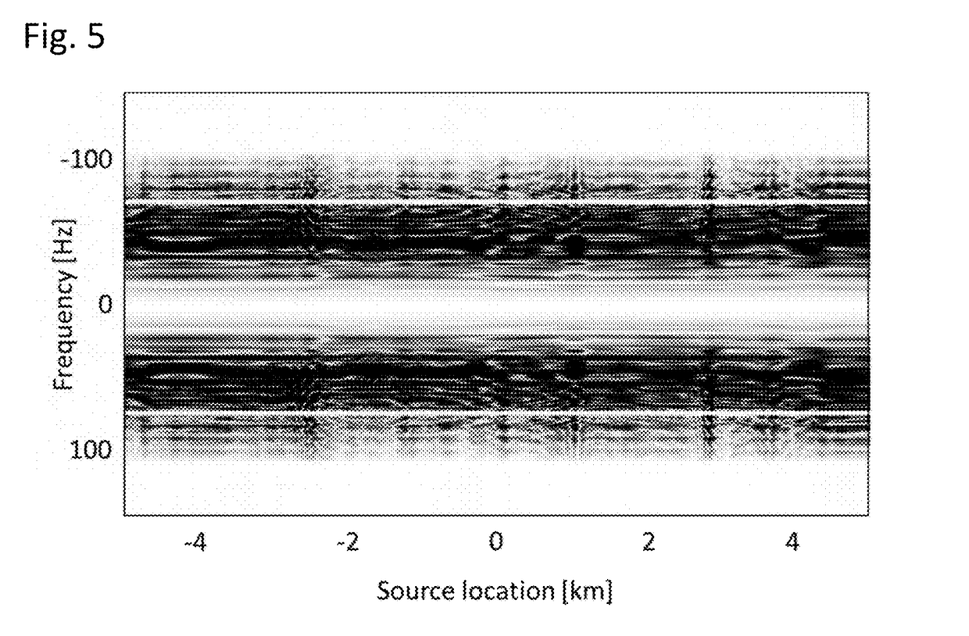
FIG. 5 shows reconstruction using periodic single-scale encoding.
Figure 6:
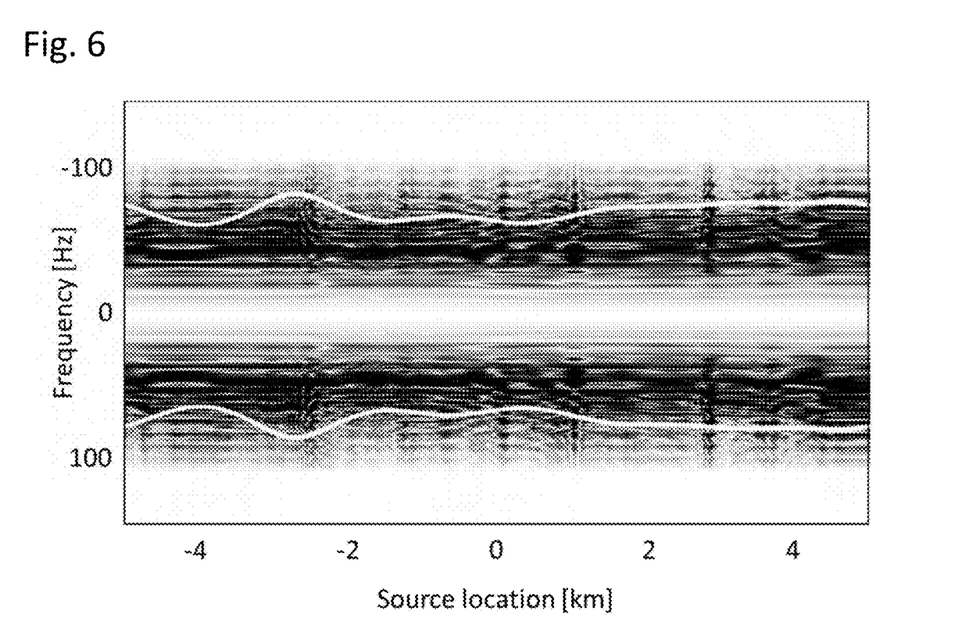
FIG. 6 illustrates reconstruction using heteroscale encoding.

FIGS. 1-3 provide an example where the notch effects from different encoding patterns are illustrated. FIG. 1 shows the original data in the f-x domain, whereas FIG. 2 shows a reconstruction using periodic single-scale encoding with a single time-shift modulation function applied. FIG. 3 shows reconstruction using heteroscale encoding where the notch frequency varies with source location and which thus introduces notch diversity.

The dealiasing methods introduced by van Manen et al. (2016b) and Andersson et al. (2017a) can also be applied in conjunction with the current invention and the scope of the current invention is not limited to sufficiently sampled data. Thus, for example, it is possible to introduce directionality penalties to reduce aliasing ambiguity in the separation at higher frequencies by means of estimating local directionality structure using partial reconstructions comprising only the flawlessly reconstructed diamond-shaped regions. Alternatively, for example, the flawlessly reconstructed diamond-shaped regions can be used to form conjugated phase factors from an analytic part of these regions and combined with an analytic part of the obtained wavefield recordings to derive essentially non-aliased functions that can be filtered and recombined using non-conjugated phase factors to yield essentially dealiased and separated wavefield recordings.

The current invention is not limited to data acquired without deviations or perturbations in the nominal (that is, intended) heteroscale modulation functions and the methods introduced by van Manen et al. [2016a] can be applied in conjunction with the current invention when such deviations or perturbations are present on top of the nominal heteroscale modulation functions to yield improved results. For example, provided the actual heteroscale modulation functions are known (that is, including the deviations/perturbations), the Fourier transform of the actual modulation functions can be used to set up a so-called cyclic convolution matrix which models the actual scaling and replication of the signal along the wavenumber axis/axes. This can be used to set up and and invert a model of the actual obtained wavefield recordings.

Provided the perturbations/deviations in the nominal heteroscale modulation functions are sufficiently small, one or more of the advantages of the current invention will at least be partially retained and may be improved by using the methods introduced by van Manen et al. [2016a], including as explained herein.

The methods described herein have mainly been illustrated using so-called common receiver gathers, i.e., all seismograms recorded at a single receiver. Note however, that the method can be applied straightforwardly over one or more receiver coordinates, to individual or multiple receiver-side wavenumbers. Processing in such multi-dimensional or higher-dimensional spaces can be utilized to reduce data ambiguity due to sampling limitations of the seismic signals.

We note that further advantages may derive from applying the current invention to two- or three-dimensional shot activation grids, where beyond, e.g., the (inline) x-location of the simultaneous sources, the shot grids also extend in (crossline) y-location and/or the vertical (z or depth) direction (van Manen et al., 2016c). Furthermore, the methods described herein could be applied to different two-dimensional shot activation grids, such as shot activation grids in the x-z plane or y-z plane. The vertical wavenumber is limited by the dispersion relation and hence the encoding and decoding can be applied similarly to 2D or 3D shot activation grids which involve the z (depth) dimension, including by making typical assumptions in the dispersion relation. In these and other cases, the 2D modulation functions may have one or more short scales complemented by one or more longer scales which may or may not align with the axes of the shot activation grids or be fully parallel with each other.

As should be clear to one possessing ordinary skill in the art, the methods described herein apply to different types of wavefield signals recorded (simultaneously or non-simultaneously) using different types of sensors, including but not limited to; pressure and/or one or more components of the particle motion vector (where the motion can be: displacement, velocity, or acceleration) associated with compressional waves propagating in acoustic media and/or shear waves in elastic media. When multiple types of wavefield signals are recorded simultaneously and are or can be assumed (or processed) to be substantially co-located, we speak of so-called "multi-component" measurements and we may refer to the measurements corresponding to each of the different types as a "component". Examples of multi-component measurements are the pressure and vertical component of particle velocity recorded by an ocean bottom cable or node-based seabed seismic sensor, the crossline and vertical component of particle acceleration recorded in a multi-sensor towed-marine seismic streamer, or the three component acceleration recorded by a microelectromechanical system (MEMS) sensor deployed e.g. in a land seismic survey.

The methods described herein can be applied to each of the measured components independently, or to two or more of the measured components jointly. Joint processing may involve processing vectorial or tensorial quantities representing or derived from the multi-component data and may be advantageous as additional features of the signals can be used in the separation. For example, it is well known in the art that particular combinations of types of measurements enable, by exploiting the physics of wave propagation, processing steps whereby e.g. the multi-component signal is separated into contributions propagating in different directions (e.g., wavefield separation), certain spurious reflected waves are eliminated (e.g., deghosting), or waves with a particular (non-linear) polarization are suppressed (e.g., polarization filtering). Thus, the methods described herein may be applied in conjunction with, simultaneously with, or after such processing of two or more of the multiple components.

Further, it should be understood that the various features, aspects and functionality described in one or more of the individual embodiments are not limited in their applicability to the particular embodiment with which they are described, but instead can be applied, alone or in various combinations, to one or more of the other embodiments of the invention.

For example, it is understood that the techniques, methods and systems that are disclosed herein may be applied to all marine, seabed, borehole, land and transition zone seismic surveys, that includes planning, acquisition and processing. This includes for instance time-lapse seismic, permanent reservoir monitoring, VSP and reverse VSP, and instrumented borehole surveys (e.g. distributed acoustic sensing). Moreover, the techniques, methods and systems disclosed herein may also apply to non-seismic surveys that are based on wavefield data to obtain an image of the subsurface.

Figure 9:
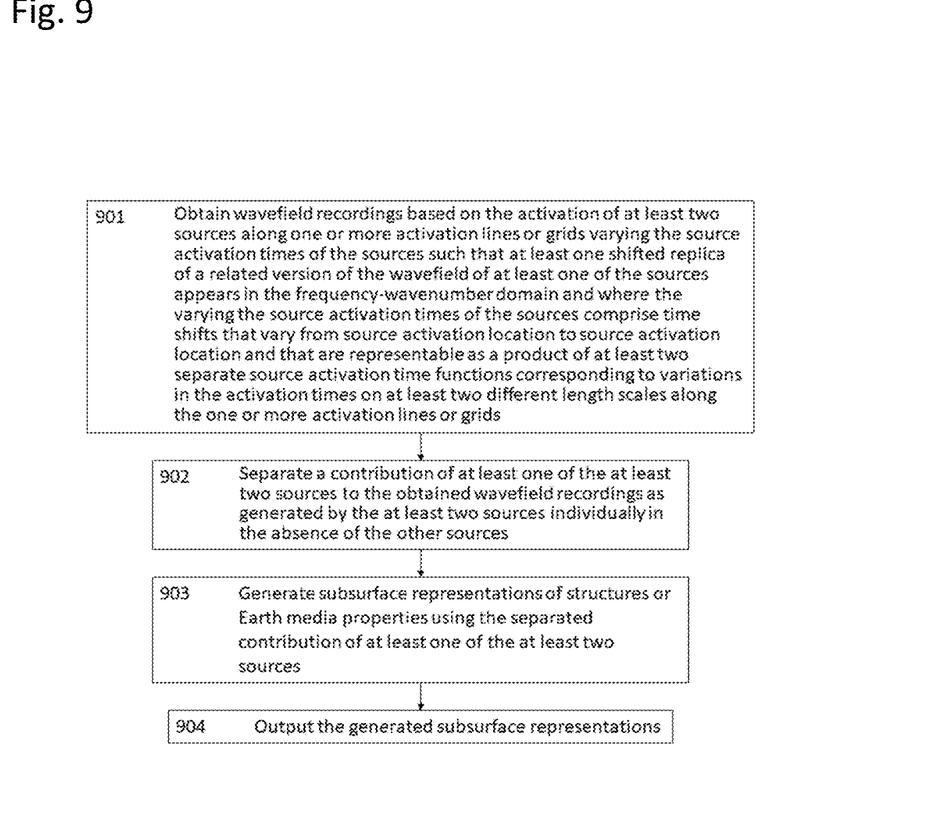
FIG. 9 summarizes key steps for one embodiment of the methods disclosed herein.

In FIG. 9, the key steps for one embodiment of the methods disclosed herein are summarized. In a first step, 901, wavefield recordings are obtained based on the activation of at least two sources along one or more activation lines or grids varying the source activation times of the sources such that at least one shifted replica of a related version of the wavefield of at least one of the sources appears in the frequency-wavenumber domain and where the varying the source activation times of the sources comprise time shifts that vary from source activation location to source activation location and that are representable as a product of at least two separate source activation time functions corresponding to variations in the activation times on at least two different length scales along the one or more activation lines or grids. This is done in accordance with the general practice of marine or land seismic acquisition and/or the methods disclosed herein. In a second step, 902, A contribution of at least one of the at least two sources to the obtained wavefield recordings as generated by the at least two sources individually in the absence of the other sources is separated. In a third step, 903, subsurface representations of structures or Earth media properties are generated using the separated contribution of at least one of the at least two sources. In a fourth step, 904, the generated subsurface representations are output.

The methods described herein may be understood as a series of logical steps and (or grouped with) corresponding numerical calculations acting on suitable digital representations of the acquired seismic recordings, and hence can be implemented as computer programs or software comprising sequences of machine-readable instructions and compiled code, which, when executed on the computer produce the intended output in a suitable digital representation. More specifically, a computer program can comprise machine-readable instructions to perform the following tasks:

(1) Reading all or part of a suitable digital representation of the obtained wave field quantities into memory from a (local) storage medium (e.g., disk/tape), or from a (remote) network location;

(2) Repeatedly operating on the all or part of the digital representation of the obtained wave field quantities read into memory using a central processing unit (CPU), a (general purpose) graphical processing unit (GPU), or other suitable processor. As already mentioned, such operations may be of a logical nature or of an arithmetic (i.e., computational) nature. Typically the results of many intermediate operations are temporarily held in memory or, in case of memory intensive computations, stored on disk and used for subsequent operations; and (3) Outputting all or part of a suitable digital representation of the results produced when there no further instructions to execute by transferring the results from memory to a (local) storage medium (e.g., disk/tape) or a (remote) network location.

Computer programs may run with or without user interaction, which takes place using input and output devices such as keyboards or a mouse and display. Users can influence the program execution based on intermediate results shown on the display or by entering suitable values for parameters that are required for the program execution. For example, in one embodiment, the user could be prompted to enter information about e.g., the average inline shot point interval or source spacing. Alternatively, such information could be extracted or computed from metadata that are routinely stored with the seismic data, including for example data stored in the so-called headers of each seismic trace.

Figure 10:
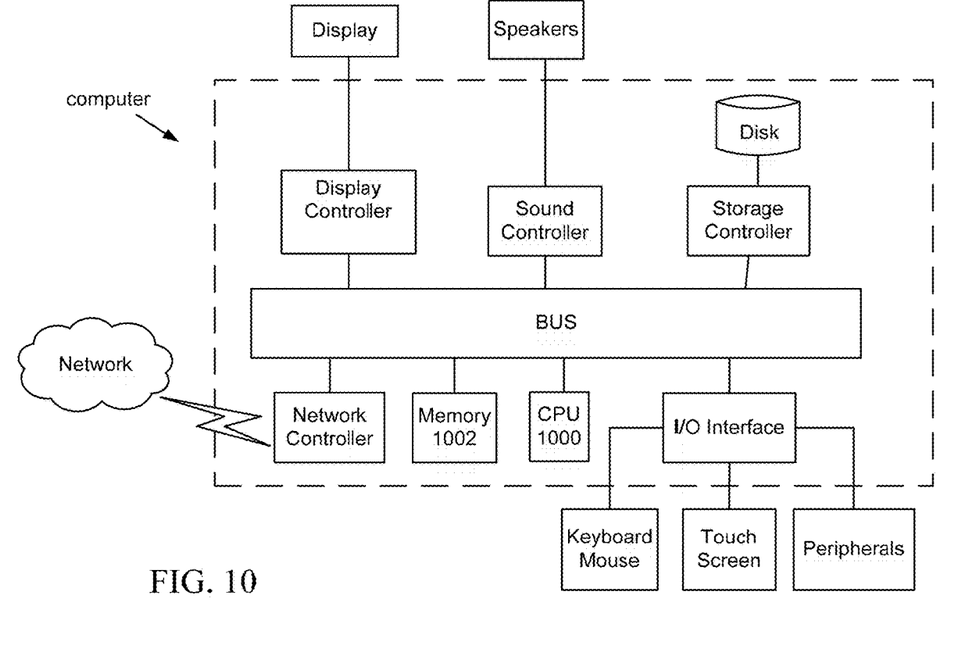
FIG. 10 illustrates how the methods herein may be computer-implemented.

Next, a hardware description of a computer or computers used to perform the functionality of the above-described exemplary embodiments is described with reference to FIG. 10. In FIG. 10, the computer includes a CPU 1000 (an example of "processing circuitry") that performs the processes described above. The process data and instructions may be stored in memory 1002. These processes and instructions may also be stored on a storage medium disk such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which computer communicates, such as a server or another computer.

Further, the claimed advancements may be provided as a utility application, background daemon, or component of an operating system, or combination thereof, executing in conjunction with CPU 1000 and an operating system such as Microsoft Windows 10, UNIX, Solaris, LINUX, Apple MAC-OS and other systems known to those skilled in the art.

The hardware elements in order to achieve the computer can be realized by various circuitry elements, known to those skilled in the art. For example, CPU 1000 can be a Xenon or Core processor from Intel of America or an Opteron processor from AMD of America, or may be other processor types that would be recognized by one of ordinary skill in the art (for example so-called GPUs or GPGPUs). Alternatively, the CPU 1000 can be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above.

LIST OF CITED REFERENCES

[Abma et al., 2015] R. Abma, D. Howe, M. Foster, I. Ahmed, M. Tanis, Q. Zhang, A. Arogunmati and G. Alexander, Geophysics. 80, WD37 (2015).

[Andersson et al., 2016] Andersson, F., Eggenberger, K., van Manen, D. J., Robertsson, J., & Amundsen, L. (2016). Seismic apparition dealiasing using directionality regularization. In SEG Technical Program Expanded Abstracts 2016 (pp. 56-60). Society of Exploration Geophysicists.

[Andersson et al., 2017a] Andersson, F., van Manen, D. J., Robertsson, J. O. A., Wittsten, J., and Eggenberger, K., 2017, Method for dealiasing data: GB patent application No. 1700520.8 filed on 12 Jan. 2017.

[Andersson et al., 2017b] Andersson, F., Robertsson, J., van Manen, D. J., Wittsten, J., Eggenberger, K., and Amundsen, L., 2017, Flawless diamond reconstruction for simultaneous source separation: 79th Conference and Exhibition, EAGE, Extended Abstracts.

[Akerberg et al., 2008] Akerberg, P., Hampson, G., Rickett, J., Martin, H., and Cole, J., 2008, Simultaneous source separation by sparse Radon transform: 78th Annual International Meeting, SEG, Expanded Abstracts, 2801-2805, doi:10.1190/1.3063927.

[Barnes, 1992] A. E. Barnes, GEOPHYSICS, 57(5), 749-751 (1992).

[Beasley et al., 1998] Beasley, C. J., Chambers, R. E., and Jiang, Z., 1998, A new look at simultaneous sources: 68th Annual International Meeting, SEG, Expanded Abstracts, 133-136.

[Bracewell, 1999] R. Bracewell, *The Fourier Transform & Its Applications* (McGraw-Hill Science, 1999).

[Ikelle, 2010] L. T. Ikelle, *Coding and Decoding: Seismic Data: The Concept of Multishooting*. (Elsevier, 2010), Vol. 39.

[Kumar et al., 2015] R. Kumar, H. Wason and F. J. Herrmann, Geophysics. 80, WD73 (2015).

Laws, R. M., Halliday, D. F., Özbek, A., and Hopperstad, F., 2016, Exploiting the control of phase in marine vibrators: The First Break, 34(11), pp: 65-74.

[Lynn et al., 1987] Lynn, W., Doyle, M., Larner, K., and Marschall, R., 1987, Experimental investigation of interference from other seismic crews: Geophysics, 52, 1501-1524.

[Moldoveanu et al., 2008] Moldoveanu, N., Kapoor, J., and Egan, M., 2008, Full-azimuth imaging using circular geometry acquisition: The Leading Edge, 27(7), 908-913. doi: 10.1190/1.2954032

[Mueller et al., 2015] M. B. Mueller, D. F. Halliday, D. J. van Manen and J. O. A. Robertsson, Geophysics. 80, V133 (2015).

[Robertsson et al., 2012] Robertsson, J. O. A., Halliday, D., van Manen, D. J., Vasconcelos, I., Laws, R., Özdemir, K., and Grønaas, H., 2012, Full-wavefield, towed-marine seismic acquisition and applications: 74th Conference and Exhibition, EAGE, Extended Abstracts.

[Robertsson et al., 2015] Robertsson, J. O. A., R. M. Laws, and J. E. Kragh, 2015, Marine seismic methods, in Resources in the near-surface Earth (eds. L. Slater and D. Bercovici), Treatise on Geophysics, $2^{nd}$ edition (ed. G. Schubert), Elsevier-Pergamon, Oxford.

[Robertsson et al., 2016] Robertsson, J. O. A., Amundsen, L., and Pedersen, Å. S., 2016, Express Letter: Signal apparition for simultaneous source wavefield separation: Geophys. J. Int., 206(2), 1301-1305: doi: 10.1093/gji/ggw210.

[Robertsson et al., 2016b], Robertsson, J. O. A., Eggenberger, K., van Manen, D. J., and Andersson, F., 2016, Simultaneous source acquisition and separation method, GB Patent application 1619037.3 filed on Nov. 10, 2016.

[Shipilova et al., 2016] Shipilova, E., Barone, I., Boelle, J. L., Giboli, M., Piazza, J. L., Hugonnet, P., and Dupinet, C., 2016, Simultaneous-source seismic acquisitions: do they allow reservoir characterization? A feasibility study with blended onshore real data: 86th Annual International Meeting, SEG, Expanded Abstracts.

[Soubaras and Lafet, 2013] Soubaras, R., and Lafet, Y.,2013, Variable-depth streamer acquisition: Broadband data for imaging and inversion, Geophysics, 78(2), WA27-WA39.

[Stefani et al., 2007] Stefani, J., Hampson, G., and Herkenhoff, E. F., 2007, Acquisition using simultaneous sources: 69th Annual International Conference and Exhibition, EAGE, Extended Abstracts, B006.

[Stockwell, 1996] R. G. Stockwell, L. Mansinha, and R. P. Lowe. Signal Processing, IEEE Transactions on 44(4), 998-1001 (1996).

[Ziolkowski, 1987] Ziolkowski, A. M., 1987, The determination of the far-field signature of an interacting array of marine seismic sources from near-field measurements: Results from the Delft Air Gun experiment: First Break, 5, 15-29.

[van Manen et al., 2016a] van Manen, D. J., Andersson, F., Robertsson, J. O. A., and Eggenberger, K., 2016, Source separation method: GB Patent Application No. 1603742.6 filed on 4 Mar. 2016.

[van Manen et al., 2016b] D. J. van Manen, F. Andersson, J. O. A. Robertsson, K. Eggenberger, 2016, De-aliased source separation method: GB patent application No. 1605161.7 filed on 28 Mar. 2016.

[van Manen et al., 2016c] van Manen, D. J., Andersson, F., Robertsson, J. O. A., and Eggenberger, K., 2016, Simultaneous source acquisition and separation on general related sampling grids: GB patent application No. 1608297.6 filed on 12 May 2016

The invention claimed is:

1. A wavefield acquisition and processing method, comprising: obtaining wavefield recordings based on activation of at least two sources along one or more activation lines or grids while varying the source activation times of the sources such that at least one shifted replica of a related version of the wavefield of at least one of the sources appears in the frequency- wavenumber domain; separating a contribution of at least one of the at least two sources to the obtained wavefield recordings as generated by the at least two sources individually in absence of other sources; generating subsurface representations of structures or Earth media properties using the separated contribution of the at least one of the at least two sources; and outputting the generated subsurface representations, wherein the varying of the source activation times of the at least two sources comprises time shifts that vary from one source activation location to another source activation location and that are representable as a product of at least two separate source activation time functions corresponding to variations in the activation times on at least two different length scales along the one or more activation lines or grids.

2. The method of claim 1, wherein the varying of the source activation times on at least two different length scales are chosen before or during the acquisition.

3. The methods of claim 1, wherein the at least one shifted replica of the related version of the wavefield of the at least one of the sources is a wavefield with limited, cone-shaped support.

4. The method of claim 1, wherein the varying of the source activation times on the at least two different length scales comprises variations on a first scale including a periodic part, and variations on a second scale that introduce further notch diversity with avoidance of non-diverse notches associated with the periodic part.

5. The method of claim 4, wherein the variations on the first scale give rise to substantially non-overlapping diamond-shaped regions in the frequency-wavenumber domain and the variations on the second scale are chosen to be slow as a function of space such that the corresponding separate source activation time functions have relatively small numerical support in a spatial transform domain.

6. The method of claim 1, wherein the variations in the source activation times on the at least two different length scales enables computation of a stable inverse matrix, which is required in the separation of the contribution.

7. The method of claim 1, wherein the variations in the source activation times on the at least two different length scales enables changing, away from zero, a determinant of a matrix whose inverse is required in the separation of the contribution.

8. The method of claim 1, wherein the step of separating the contribution is carried out in the frequency-space domain.

9. The method of claim 5, wherein the variations on the second scale are smooth enough so that convolutions they cause in the frequency-wavenumber domain do not substantially change the non-overlapping diamond-shaped regions in the frequency-wavenumber associated with varying the source activation times only on a single first scale.

10. The method of claim 1, wherein the obtained wavefield recordings for multilple receivers are processed jointly in a multi-dimensional or higher-dimensional space where aliasing ambiguity is reduced.

11. The method of claim 1, wherein the separating step further comprises seismic data processing steps including at least one of imaging, migration, and demultiple for which dealiasing allows for better data quality.

12. The method of claim 1, wherein the obtained wavefield recordings comprise multiple components.

13. The method of claim 12, wherein one or more of the multiple components have a contribution separated independently, or two or more of the multiple components have a contribution separated jointly.

14. The method of claim 12, wherein one or more of the multiple components are combined before one or more products of the combination have a contribution separated.

15. The method of claim 1 applied to land seismic data, marine seismic data, seabed seismic data, permanent monitoring seismic data, time-lapse seismic data, transition zone seismic data or borehole seismic data with near surface or downhole placed receivers, and sources such as VSP, 3D VSP, or distributed acoustic sensing seismic data.

16. The method of claim 1, wherein one of the at least two different length scales corresponds to two, three, four, five, six, seven, or eight times a distance between source activation locations along one or more directions of the activation lines or grids, or a representative average of distances between source activation locations.

17. The method of claim 16, wherein a second or higher length scale of the at least two different length scales corresponds to N times a distance between source activation locations along the one or more directions of the activation lines or grids, or a representative average of distances between source activation locations, and wherein N is an integer larger than a total number of source activation points along one or more directions of the source activation lines or grids.

18. The method of claim 1, wherein the variations in the activation times on the at least two different length scales along the one or more activation lines or grids result in the source activation times being non-periodic.

* * * * *